(12) United States Patent
Kuwajima

(10) Patent No.: US 8,971,162 B1
(45) Date of Patent: Mar. 3, 2015

(54) OPTICAL DISC DEVICE AND METHOD FOR DRIVING THE SAME

(71) Applicant: Funai Electric Co., Ltd., Osaka (JP)

(72) Inventor: Mamoru Kuwajima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/461,488

(22) Filed: Aug. 18, 2014

(30) Foreign Application Priority Data

Aug. 21, 2013 (JP) ................. 2013-171523

(51) Int. Cl.
  *G11B 7/00* (2006.01)
  *G11B 7/09* (2006.01)
(52) U.S. Cl.
  CPC ..................... *G11B 7/094* (2013.01)
  USPC .................. 369/44.29; 369/44.35; 369/44.41
(58) Field of Classification Search
  None
  See application file for complete search history.

(56) References Cited

U.S. PATENT DOCUMENTS

| | | | | |
|---|---|---|---|---|
| 5,875,157 | A * | 2/1999 | Sasaki et al. ............... | 369/44.29 |
| 5,886,963 | A * | 3/1999 | Abe et al. .................... | 369/44.29 |
| 6,266,301 | B1 * | 7/2001 | Morimoto .................. | 369/44.23 |
| 7,242,648 | B2 | 7/2007 | Yamada et al. | |
| 2004/0213102 | A1 | 10/2004 | Yamada et al. | |
| 2006/0098540 | A1 * | 5/2006 | Ando ........................ | 369/44.41 |
| 2007/0291596 | A1 * | 12/2007 | Fujiune et al. ............. | 369/30.03 |
| 2009/0097366 | A1 * | 4/2009 | Yamamuro ................ | 369/44.32 |
| 2011/0038244 | A1 * | 2/2011 | Huang et al. .................... | 369/94 |
| 2011/0228654 | A1 * | 9/2011 | Isshiki et al. ............... | 369/44.11 |
| 2013/0028063 | A1 * | 1/2013 | Isshiki ........................ | 369/44.34 |
| 2013/0343172 | A1 * | 12/2013 | Isshiki et al. ............. | 369/110.02 |

FOREIGN PATENT DOCUMENTS

| | | |
|---|---|---|
| JP | 10-241172 | 9/1998 |
| JP | 2000-331355 | 11/2000 |
| JP | 2000-331356 | 11/2000 |
| JP | 2004-348935 | 12/2004 |
| JP | 2011-187094 | 9/2011 |
| JP | 2012-190525 | 10/2012 |
| JP | 2012-190526 | 10/2012 |

* cited by examiner

*Primary Examiner* — Thang Tran
(74) *Attorney, Agent, or Firm* — Wenderoth, Lind & Ponack, L.L.P.

(57) ABSTRACT

Provided is an optical disc device including: an optical pickup which includes an objective lens and a receiver unit which receives light reflected off an optical disc; a signal processing unit which generates a main push-pull signal and sub push-pull signals from signals from the receiver unit, and obtains a signal obtained by subtracting the main push-pull signal from the sub push-pull signal multiplied K times, to generate a tracking-error signal; and a control unit which performs a midpoint servo process, an offset process of adding an offset value to a lens-error signal indicating displacement of the objective lens, a stabilization awaiting process of waiting for oscillation of the optical disc to stabilize, a measurement process of measuring the tracking-error signal, and a K value adjusting process of adjusting a value of K in response to a result of the measurement process.

10 Claims, 13 Drawing Sheets

OPTICAL DISC DEVICE AND METHOD FOR DRIVING THE SAME

CROSS REFERENCE TO RELATED APPLICATION

The present application is based on and claims priority of Japanese Patent Application No. 2013-171523 filed on Aug. 21, 2013. The entire disclosure of the above-identified application, including the specification, drawings and claims is incorporated herein by reference in its entirety.

FIELD

The present invention relates to an optical disc device and a method for driving the optical disc device.

BACKGROUND

Optical disc devices read and write data from and into one or more media, such as a digital versatile disc (DVD) or a Blu-ray (registered trademark) disc (BD).

Optical disc devices, for example, include a spindle motor, a spindle motor drive unit, an optical pick-up unit (OPU), and a control unit. The spindle motor and spindle motor drive unit control the rotation of an optical disc. The optical pick-up unit reads data stored in the optical disc. The control unit provides control over components of the optical disc device.

An optical pickup, for example, includes an objective lens and a receiver unit. The objective lens focuses a laser light from a predetermined light source anywhere on an optical disc. The receiver unit receives light reflected off the optical disc.

It should be noted that optical disc devices in general perform tracking control for an optical pickup by a differential push-pull method. Alternatives for the tracking control for optical pickup include a phase contrast method.

In the differential push-pull method, the optical pickup generates one main beam and two sub beams from light output from a light source and emits the beams to an optical disc. The receiver unit of the optical pickup receives light of the main beam reflected off the optical disc to generate a main push-pull signal. The receiver unit also receives light of the sub beams reflected off the optical disc to generate a sub push-pull signal. The signal processing unit of the optical disc device subtracts a signal obtained by multiplying the sub push-pull signal K times from the main push-pull signal to generate a differential push-pull signal. The signal processing unit generates a tracking-error signal from the generated differential push-pull signal.

CITATION LIST

Patent Literature

[PTL 1] Japanese Unexamined Patent Application Publication No. 2012-190525

SUMMARY

Technical Problem

As described above, the optical disc device performs the tracking control, using the tracking-error signal generated from the differential push-pull signal. Thus, to provide good tracking control, a value of K needs to be finely adjusted.

The present invention is made to address the above-described problem and has an object to provide an optical disc device and a method for driving the optical disc device, which allow fine adjustment of the value of K in the differential push-pull method.

Solution to Problem

To achieve the above object, an optical disc device according to one aspect of the present invention includes: an optical pickup including an objective lens which focuses a laser light from a predetermined light source on any position on an optical disc, and a receiver unit configured to receive light reflected off the optical disc; a signal processing unit configured to generate a main push-pull signal and a sub push-pull signal from signals from the receiver unit, and subtract, from the main push-pull signal, a signal obtained by multiplying the sub push-pull signal K times, to generate a tracking-error signal; and a control unit configured to perform tracking control in response to the tracking-error signal and a lens-error signal which indicates displacement of the objective lens, wherein the control unit is configured to perform: a midpoint servo process of aligning a radial position of the objective lens with a midpoint location; an offset process of adding an offset value to the lens-error signal after a start of the midpoint servo process; a stabilization awaiting process of waiting for oscillation of the optical disc to stabilize, after performing the offset process; a measurement process of measuring the tracking-error signal using the signal processing unit, after performing the stabilization awaiting process; and a K value adjusting process of adjusting a value of the K, in response to a result of the measurement process.

The optical disc device according to the above configuration performs the stabilization awaiting process for waiting for reduction of the lens oscillation which is associated with the optical disc oscillation, thereby effectively reducing variation in value of K. Here, waiting for the optical disc oscillation to stabilize does not refer only to waiting for complete stabilization of the oscillation. Stabilization of the optical disc oscillation also includes reduced optical disc oscillation and reduced variation in value of K, as compared with the oscillation immediately after the movement of the objective lens.

For example, the control unit may wait for a first fixed time, which is set previously, to elapse in the stabilization awaiting process to wait for the oscillation of the optical disc to stabilize.

The optical disc device according to the above configuration sets the first fixed time in the stabilization awaiting process. This allows simplified device configuration.

Furthermore, the first fixed time may be set in response to the offset value or may be set to 5 msec or greater and 20 msec or less when an amount of shift of the objective lens which is determined in response to the offset value is 100 μm.

In the optical disc device according to the above configuration, a time taken for the lens oscillation to reduce depends on the offset value and the characteristics of the optical disc device. Thus, the first fixed time can be set previously.

Moreover, for example, in the stabilization awaiting process, the control unit may wait for a current amplitude of the lens-error signal to fall within a reference range to wait for the oscillation of the optical disc to stabilize, the reference range being predetermined.

The optical disc device according to the above configuration determines, from the amplitude of the lens-error signal, whether the oscillation of the optical disc is stabilized. This obviates the need for previously obtaining the characteristics of the optical disc device or the offset value. Moreover, the optical disc device according to the above configuration performs the stabilization awaiting process in response to the actual measurement of the lens-error signal, thereby reliably obtaining a timing of measurement of the TE signal.

Moreover, the control unit may further perform, after a start of the midpoint servo process and before performing the offset process, a reference range setting process of measuring an amplitude of the lens-error signal using the signal processing unit and setting the reference range in response to the measured amplitude.

The optical disc device according to the above configuration determines the reference range by measuring the lens-error signal. This allows proper setting of the reference range.

Furthermore, after a second fixed time has elapsed since the start of the midpoint servo process, the control unit may perform the reference range setting process.

The optical disc device according to the above configuration measures the reference level for determining the reference range, after the second fixed time has elapsed. Due to this, the reference level is measured after the lens oscillation has reduced to some extent. Thus, a proper reference level for determining the reference range can be measured.

Moreover, the reference range may be set in response to desired precision from the optical disc device, in addition to an amplitude of the lens-error signal measured.

The optical disc device according to the above configuration allows the reference range to be set depending on desired precision from an optical disc device. This allows increased versatility of the method of adjusting the value of K.

Moreover, the control unit may perform the offset process, the stabilization awaiting process, and the measurement process multiple times, changing the offset value in the offset process.

It should be noted that the present invention can be implemented not only as an optical disc device that includes such characteristic processing units but also as a method for driving an optical disc device, which includes, as steps, processes which are performed by the characteristic processing units included in the optical disc device. The present invention can also be implemented as a program for causing a computer to function as the characteristic processing units included in the optical disc device, or a program for causing a computer to execute the characteristic steps included in the method for driving the optical disc device. In addition, such a program can, of course, be distributed in a non-transitory computer-readable storage medium such as a compact disc read only memory (CD-ROM) and via a communication network such as the Internet.

Advantageous Effects

According to the present invention, an optical disc device and method for driving the optical disc device can be provided which can provide fine adjustment of the value of K in a differential push-pull method.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Details of Problem

Problems of conventional optical disc devices will be described in detail, with reference to FIGS. 1 and 2.

Examples of the above-described method of adjusting the value of K in the optical disc include a method of bringing an objective lens into misalignment with the optical disc and measuring a TE signal to retrieve a value of K. Here, the TE signal refers to a signal indicating misalignment between a track of an optical disc OD and a position on the optical disc OD at which the light is emitted. To adjust the position of the objective lens, for example, an LE signal (a lens-error signal) indicating the misalignment of the objective lens with the optical disc is adjusted. Specifically, an offset value in response to an amount of shift of the objective lens is added to the LE signal. It should be noted that in the above method of adjusting the value of K, the TE signal is measured, typically, multiple times, changing the position of the objective lens.

In the case with an optical disc that has little offset of the center of gravity (hereinafter, referred to as a "typical disc," accordingly) when placed on the optical disc device described above, the magnitude of the lens oscillation generated by rotation of the optical disc is significantly small. Thus, the adjusted value of K is considered to vary less.

However, in the case with an optical disc that has an offset of the center of gravity (hereinafter, referred to as an "eccentric disc," accordingly) when placed on the optical disc device described above, the magnitude of the lens oscillation is relatively large. An increased magnitude of the lens oscillation causes a problem of increasing variation in adjusted value of K described above.

Figure 1:
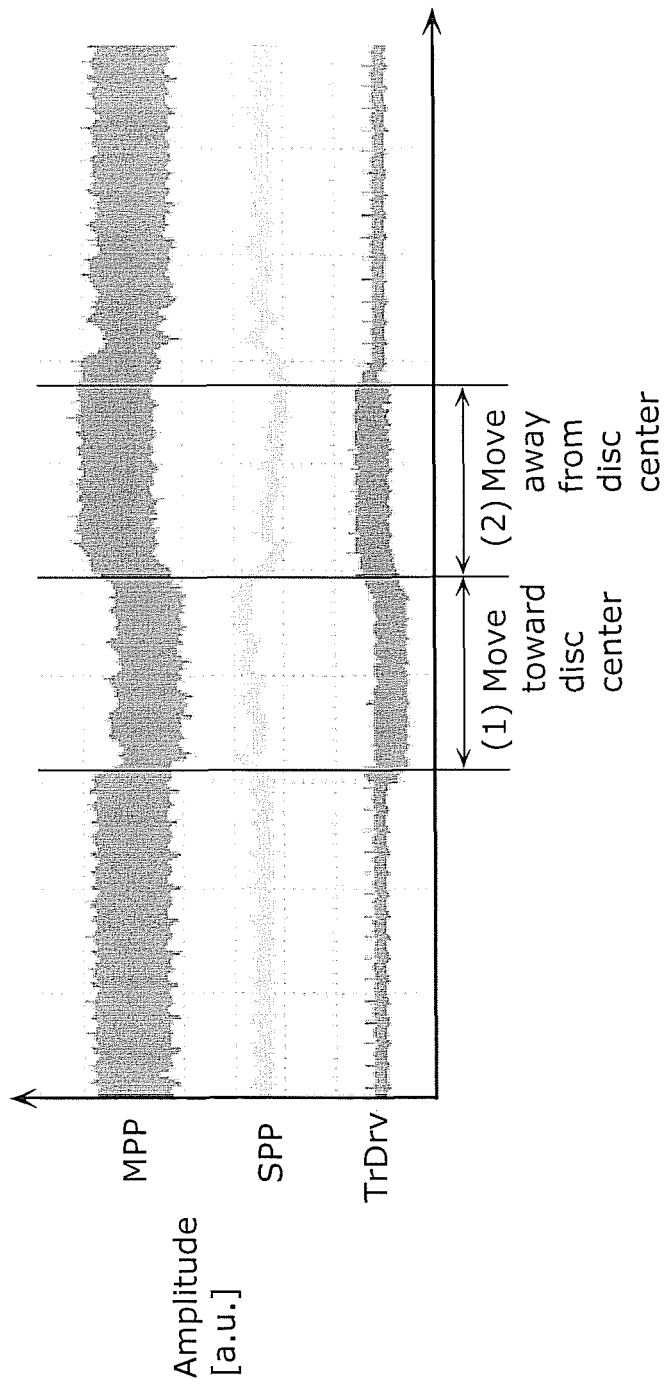
FIG. 1 is a waveform chart illustrating waveforms of a main push-pull signal MPP, a sub push-pull signal SPP, and a tracking control signal TrDrv in the case with a typical disc.

FIG. 1 is a waveform chart illustrating waveforms of a main push-pull signal MPP, a sub push-pull signal SPP, and a tracking control signal TrDrv in the case with a typical disc. FIG. 2 is a waveform chart illustrating waveforms of a main push-pull signal MPP, a sub push-pull signal SPP, and a tracking control signal TrDrv in the case with an eccentric disc. In FIGS. 1 and 2, the period (1) is a period where a positive offset value is added to the LE signal to move the objective lens toward alignment with the center of the optical disc OD, while maintaining parallel orientation (hereinafter, may simply referred to as "move toward alignment with the center of the optical disc OD"), and the TE signal is measured. The period (2) is a period where a negative offset value is added to the LE signal to move the objective lens away from alignment with the center of the optical disc OD, while maintaining parallel orientation (hereinafter, may simply referred to as "move away from alignment with the center of the optical disc OD"), and the TE signal is measured.

Figure 2:
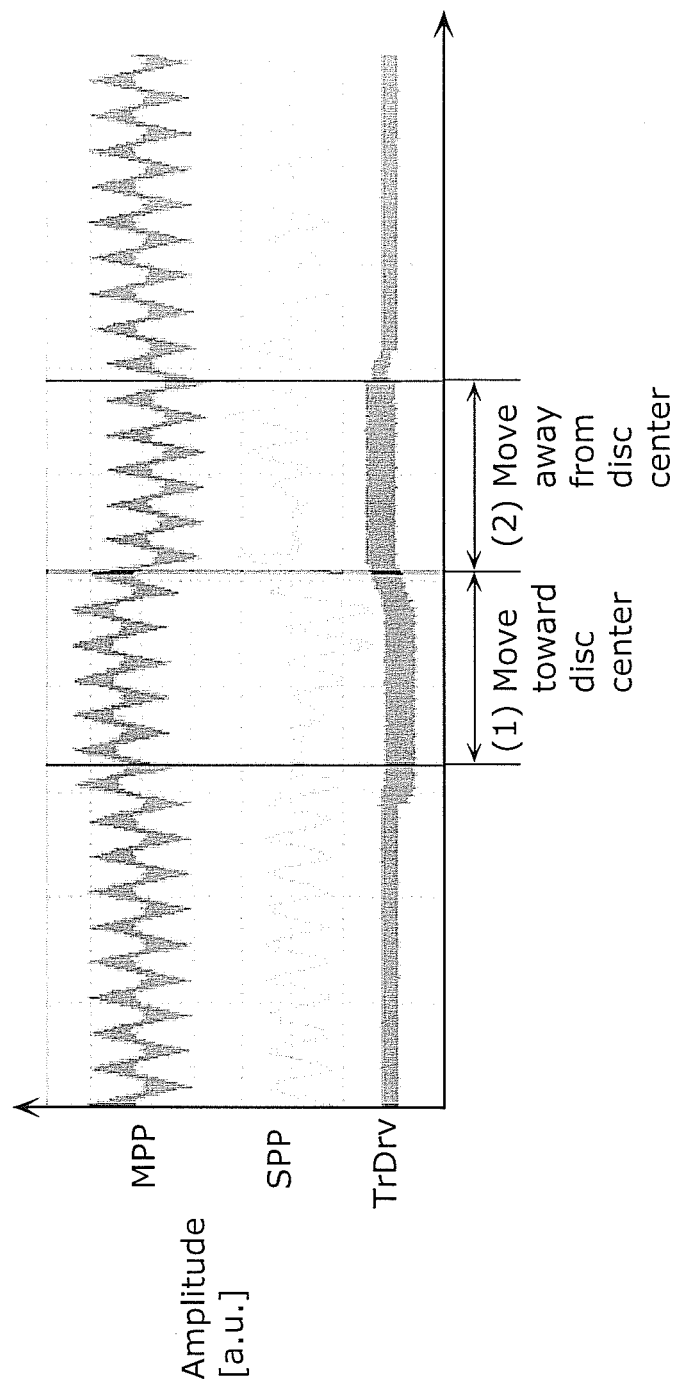
FIG. 2 is a waveform chart illustrating waveforms of a main push-pull signal MPP, a sub push-pull signal SPP, and a tracking control signal TrDrv in the case with an eccentric disc.

As can be seen from FIGS. 1 and 2, the eccentric disc has a large fluctuation in amplitude of the main push-pull signal MPP and sub push-pull signal SPP, as compared with the typical disc. In particular, as shown in the period (1) Move toward disc center of FIG. 2, the amplitudes of the main push-pull signal MPP and the sub push-pull signal SPP increase immediately after the start of the period (1) where the offset value is added to the LE signal to move the objective lens toward alignment with the center of the optical disc OD. Likewise, as shown in the period (2) Move away from disc center of FIG. 2, the amplitudes of the main push-pull signal MPP and the sub push-pull signal SPP increase immediately after the start of the period (2) where the offset value is added to the LE signal to move the objective lens away from alignment with the center of the optical disc OD. A problem in such a state where the lens oscillation occurs and the signal levels are unstable is that the adjusted value of K may vary.

Hereinafter, embodiments according to the present invention will be described, with reference to the accompanying drawings. Figures do not necessarily show precise sizes and scale ratios.

The embodiments described below are each merely preferred illustration of the present invention. Values, shapes, materials, components, arrangement or connection between the components, steps, and the order of the steps are merely illustrative, and are not intended to limit the present invention. The present invention is indicated by the appended claims. Thus, among components of the embodiments below, components not set forth in the independent claims are not necessary to achieve the present invention but will be described as components for preferable embodiments.

Embodiment 1

An optical disc device and a method for driving the same according to an embodiment 1 will be described, with reference to FIGS. 1 to 8.

An optical disc device according to the present embodiment measures a TE signal in adjusting a value of K after a certain amount of time has passed, namely, after the lens oscillation of an objective lens has reduced to some extent, rather than immediately after the objective lens is moved.

<1-1. Configuration of Optical Disc Device>

Figure 3:
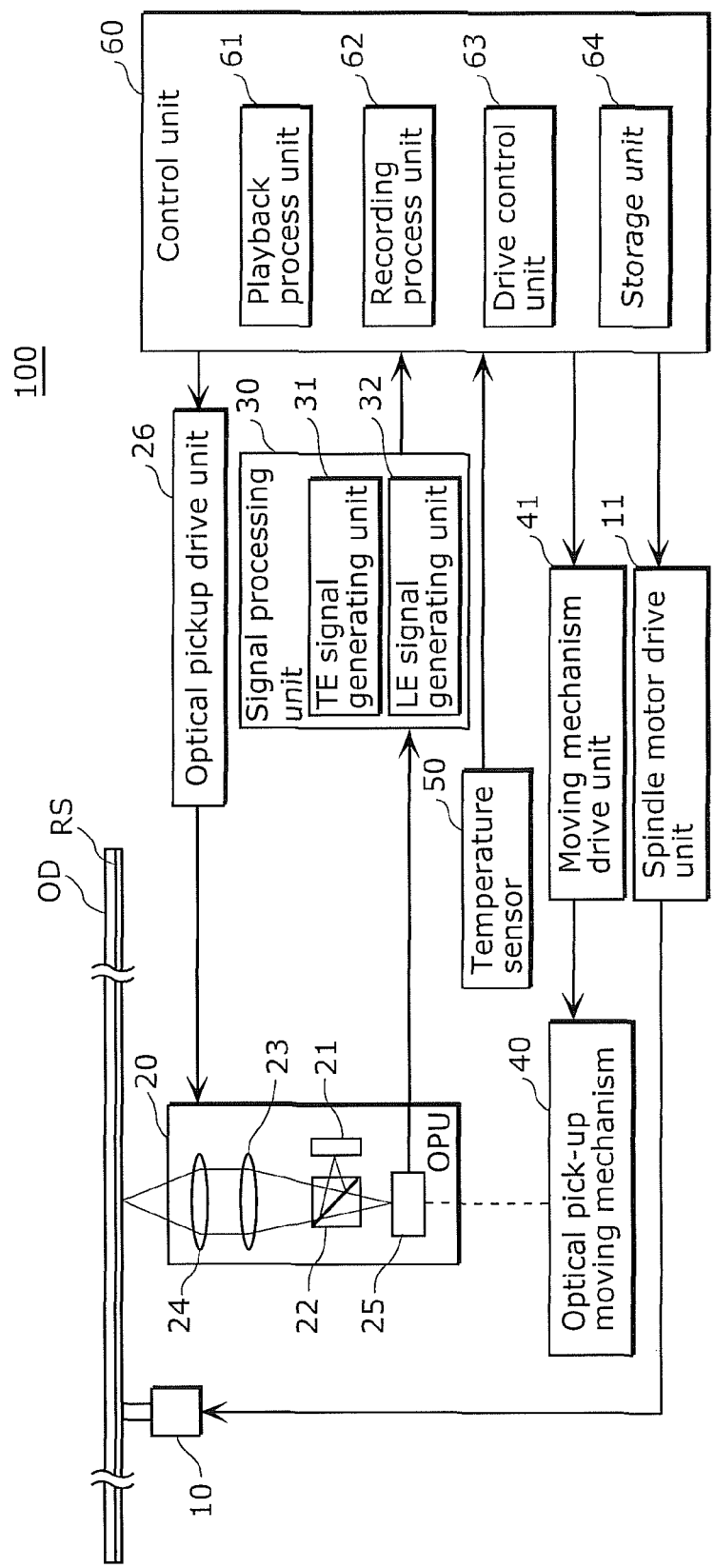
FIG. 3 is a block diagram of an example configuration of an optical disc device according to an embodiment 1.

Configuration of an optical disc device 100 will be described, with reference to FIG. 3. FIG. 3 is a block diagram of an example configuration of the optical disc device 100 according to the present embodiment.

The optical disc device 100, as shown in FIG. 3, includes:

(1) a spindle motor 10 and a spindle motor drive unit 11 which rotate an optical disc and control the rotation;
(2) an optical pickup 20 which reads data stored in the optical disc;
(3) an optical pickup drive unit 26 and a signal processing unit 30 which control the driving of optical members included in the optical pickup 20;
(4) an optical pick-up moving mechanism 40 and a moving mechanism drive unit 41 which control movement of the optical pickup 20 in the radial direction;
(5) a temperature sensor 50; and
(6) a control unit 60 which controls the components of the optical disc device 100.

(1) The spindle motor 10 is coupled to a turntable. The turntable is a member on which an optical disc OD is placed for playback or recording, which rotates in response to the driving of the spindle motor 10. The turntable is rotated while having the optical disc OD placed thereon for playback or recording, to rotate the optical disc OD.

The spindle motor drive unit 11 supplies a drive current to the spindle motor 10 in response to the control by the control unit 60, to drive the spindle motor 10.

(2) The optical pickup 20 includes optical members which emit light onto an information storage surface RS of the optical disc OD and receive light reflected off the information storage surface RS to read data stored in the information storage surface RS. It should be noted that the optical pickup 20 may include a function of writing data into the optical disc OD.

Although not shown, the optical pickup 20 is supported by two guide shafts disposed inside the optical disc device 100, and is movable along the guide shafts. The guide shafts are disposed in the radial direction of the optical pickup 20. This allows the optical pickup 20 to be movable in the radial direction.

As shown in FIG. 3, the optical pickup 20 includes, as optical members, an LD (semiconductor laser) 21, a beam splitter 22, a collimator 23, an objective lens 24, and a receiver unit 25.

The LD 21 is by way of example of a light source and a member which outputs light.

The beam splitter 22 passes therethrough light emitted from the LD 21 and transmits light to the collimator 23. More specifically, the beam splitter 22 divides the light from the LD 21 to generate one main beam and two sub beams and reflects the beams onto the collimator 23. The beam splitter 22 also directs, to the receiver unit 25, light reflected off the optical disc OD and incident on the beam splitter 22 through the objective lens 24 and the collimator 23.

The collimator 23 is a member for correcting spherical aberration in the objective lens 24. The collimator 23 is movable within the optical pickup 20 in the optical axis direction. The collimator 23 collimates light emitted through the beam splitter 22 from the LD 21. Moving the collimator 23 in the optical axis direction to adjust a distance between the collimator 23 and the objective lens 24 allows adjusting a degree of convergence or divergence of light (collimation of light) to the objective lens 24. This allows effects of the spherical aberration to be reduced.

The objective lens 24 is a member which focuses the light emitted through the collimator 23 from the LD 21 anywhere on the information storage surface RS. The objective lens 24 is in parallel orientation with the optical disc OD, and movable within the optical pickup 20 in the optical axis direction and in the radial direction of the objective lens 24. Moving the objective lens 24 in the radial direction is moving the objective lens 24 toward or away from alignment with the center of the optical disc OD, while maintaining parallel orientation. To adjust focusing, the position of the objective lens 24 is adjusted in the optical axis direction. The objective lens 24 is adjusted in the radial position to focus the light on a track (groove) of the optical disc OD. It should be noted that the present embodiment will be described with reference to a case where the objective lens 24 is movable by four tracks in the radial direction.

Figure 4:
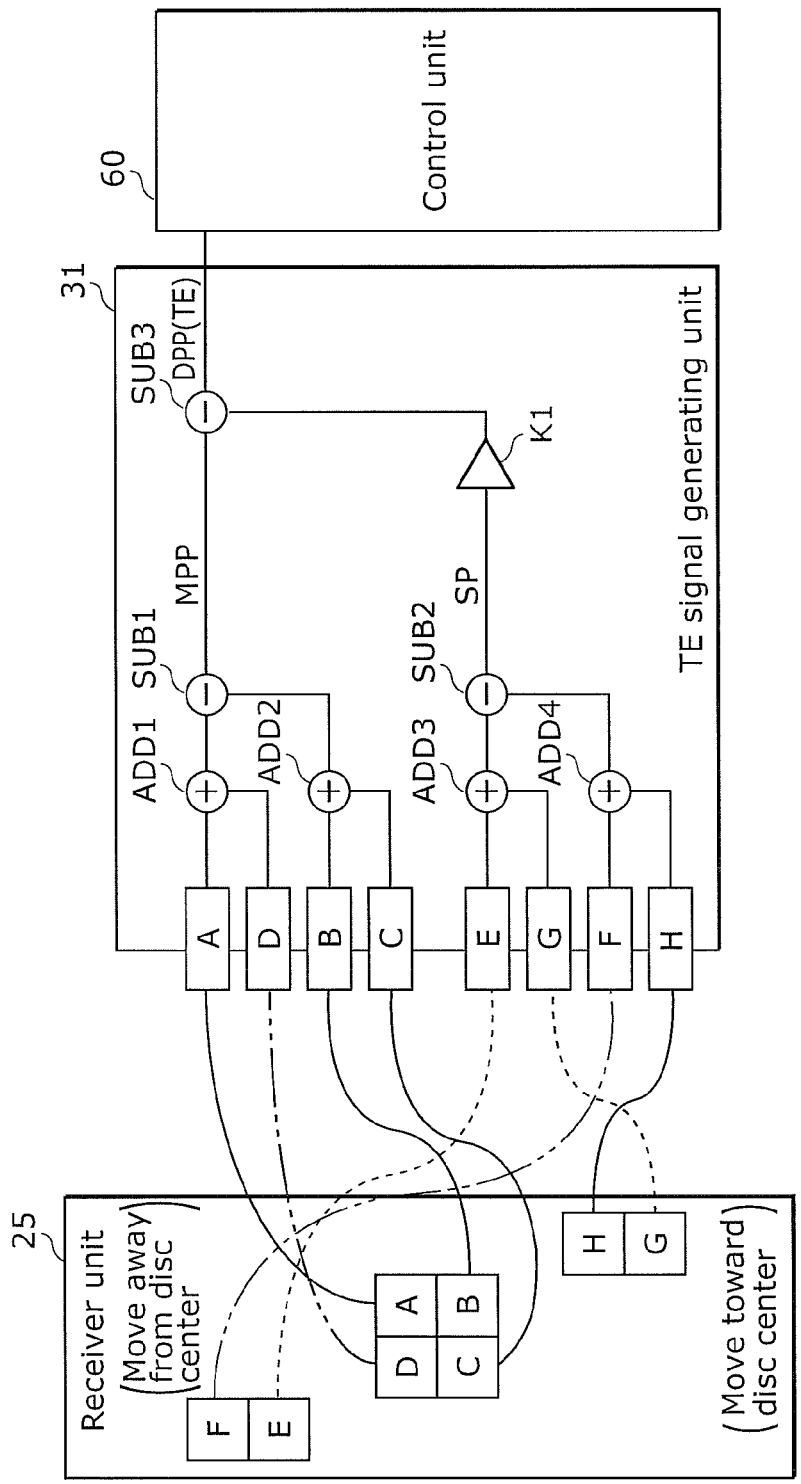
FIG. 4 is a diagram showing configuration of a receiver unit and a TE signal generating unit of an optical pickup (OPU) according to the embodiment 1.
Figure 5:
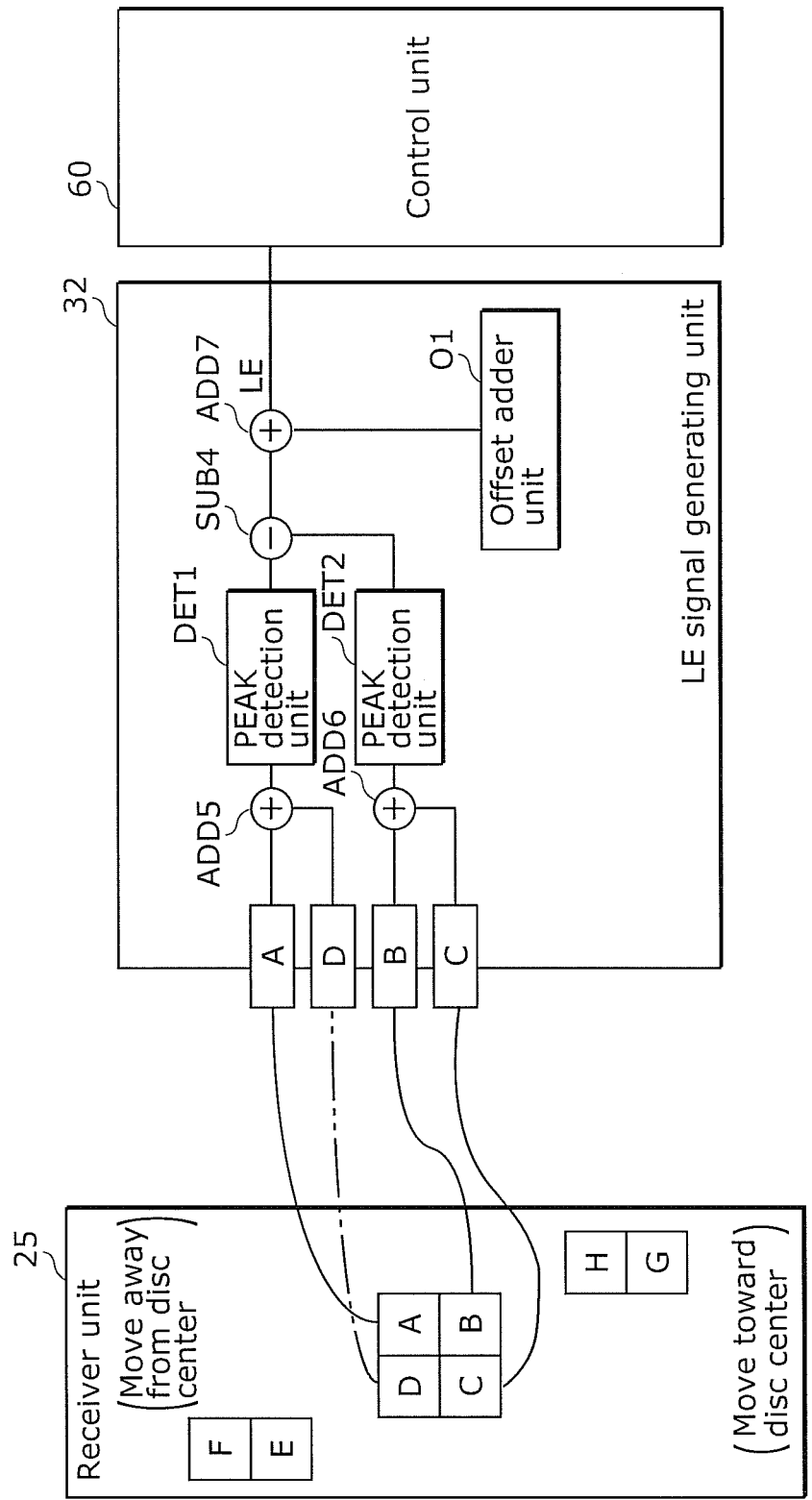
FIG. 5 is a diagram showing configuration of the receiver unit and an LE signal generating unit according to the embodiment 1.

The receiver unit 25 receives and performs photoelectric conversion on the light reflected off the information storage surface RS, and outputs to the light the control unit 60. FIG. 4 is a diagram showing a configuration of the receiver unit 25 and a TE signal generating unit 31 of the signal processing unit 30 described below. FIG. 5 is a diagram showing configuration of the receiver unit 25 and an LE signal generating unit 32 of the signal processing unit 30 described below. As shown in FIGS. 4 and 5, the receiver unit 25 includes four light-receiving elements A, B, C, and D, which receive the main beam, and four light-receiving elements E, F, G, and H which receive the sub beams.

(3) The optical pickup drive unit 26 is configured to adjust the optical members.

The signal processing unit 30, for example, generates an RF signal, an FE signal, a TE signal, and an LE signal from electric signals output from the receiver unit 25, and outputs the generated signals to the control unit 60. The signal processing unit 30, as shown in FIG. 3, includes the TE signal generating unit 31 and the LE signal generating unit 32. The TE signal generating unit 31 generates the TE signal. The LE signal generating unit 32 generates the LE signal.

The TE signal generating unit 31, as shown in FIG. 4, generates a differential push-pull signal DPP (the TE signal), using electric signals from the light-receiving elements A to H. The TE signal generating unit 31 includes adders ADD1, ADD2, ADD3, and ADD4, subtractors SUB1, SUB2, and SUB3, and a K value adjusting unit K1.

The differential push-pull signal DPP is generated by subtracting, from a main push-pull signal MPP, a signal obtained by multiplying a sub push-pull signal SPP K times. In other words, the differential push-pull signal DPP can be represented by MPP−K×SPP.

The TE signal generating unit 31, as shown in FIG. 4, generates the main push-pull signal MPP from the electric signals from the light-receiving elements A to D. The main push-pull signal MPP can be represented by A+D−(B+C).

The TE signal generating unit 31, as shown in FIG. 4, also generates the sub push-pull signal SPP from the electric signals from the light-receiving elements E to H. More specifically, the sub push-pull signal SPP can be represented by E+G−(F+H).

According to the above, the differential push-pull signal DPP can be represented by MPP−K×SPP=(A+D−(B+C))−K×(E+G−(F+H)).

The LE signal generating unit 32, as shown in FIG. 5, generates the LE signal from the electric signals from the light-receiving elements A to D. The LE signal generating unit 32 includes adders ADD5, ADD6, and ADD7, a subtractor SUB4, a PEAK detection unit DET1 and a PEAK detection unit DET2, and an offset adder unit O1.

The LE signal is generated by the subtractor SUB4 subtracting PEAK of a signal, obtained by adding the electric signal from the light-receiving element B and the electric signal from the light-receiving element C, from PEAK of a signal obtained by adding the electric signal from the light-receiving element A and the electric signal from the light-receiving element D. Furthermore, to adjust the value of K, the adder ADD7 adds, to a signal output from the subtractor SUB4, an offset value in response to an amount of shift of the objective lens 24 shown in FIG. 3 in the radial direction. The offset adder unit O1 generates the offset value.

(4) The optical pick-up moving mechanism 40, for example, includes a lead screw (feed screw, not shown) disposed in parallel with the guide shafts, and a teeth member which is engaged with threads of the lead screw and moves along with rotation of the lead screw. The teeth member is provided in the optical pickup 20, and movement of the teeth member moves the optical pickup 20 along the guide shafts.

The moving mechanism drive unit 41 controls rotation of the lead screw included in the optical pick-up moving mechanism 40, in response to a signal from the control unit 60.

(5) The temperature sensor 50 is a thermistor in the present embodiment. The temperature sensor 50 measures temperature at all times and outputs temperature information to the control unit 60.

(6) The control unit 60 is configured with a central processing unit (CPU), for example, and executes a control program stored in a storage unit 64 described below to provide control over the components of the optical disc device 100.

The control unit 60, as shown in FIG. 3, includes a playback processing unit 61, a recording processing unit 62, a drive control unit 63, and the storage unit 64.

The playback processing unit 61 decodes the RF signal output from the signal processing unit 30 and outputs the decoded RF signal externally. Examples of devices to which the decoded RF signal is output include a device having a function of playing a video such as a liquid crystal display and TV, a device having a function of outputting sound such as a loudspeaker, and a personal computer (PC).

The recording processing unit 62 encodes data input thereto externally, and outputs the encoded data to the optical pickup 20 to cause the optical pickup 20 to write the data into the optical disc OD.

The drive control unit 63 controls, for example, the spindle motor drive unit 11, the optical pickup drive unit 26, and the moving mechanism drive unit 41, based on the RF signal, the FE signal, the TE signal, and the LE signal output from the signal processing unit 30, and the temperature information output from the temperature sensor 50.

The storage unit 64 includes a random access memory (RAM) and a read only memory (ROM). The RAM temporarily stores parameters used for the control unit 60 to provide various control. The ROM stores the control program mentioned above.

<1-2. Method of Driving Optical Disc Device>

Figure 6:
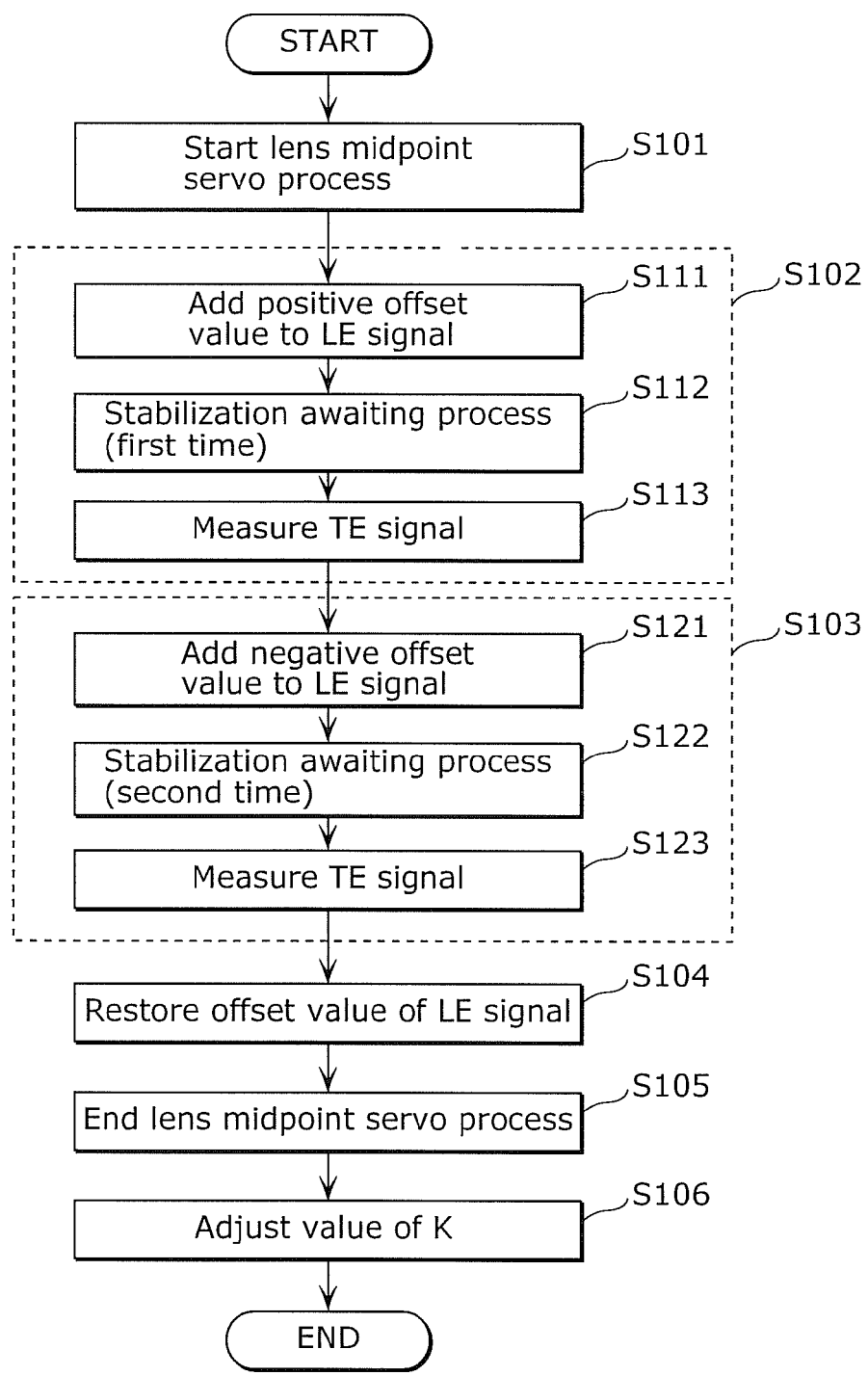
FIG. 6 is a flowchart illustrating an example operation of the optical disc device according to the embodiment 1.
Figure 8:
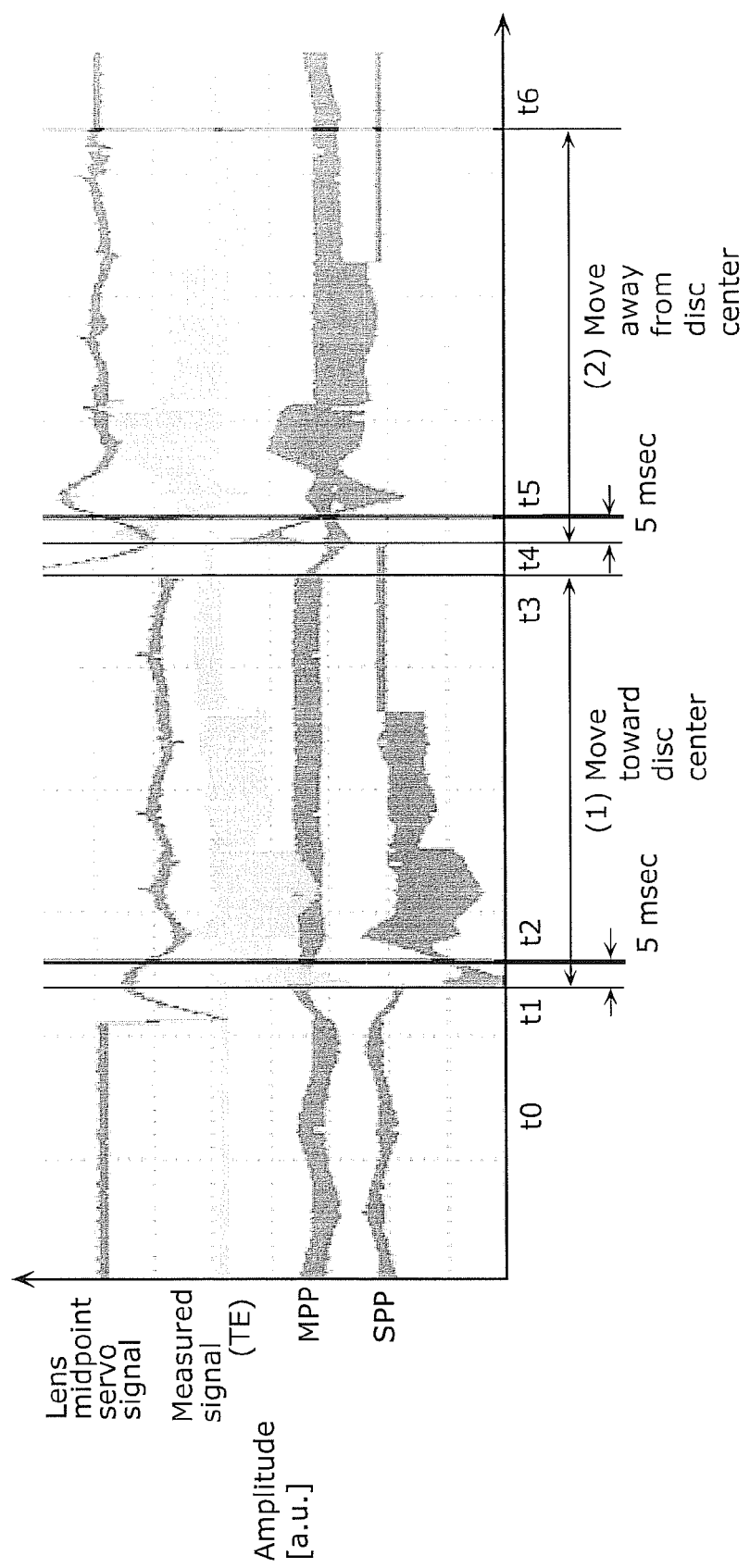
FIG. 8 is a waveform chart illustrating waveforms of a lens midpoint servo signal and a TE signal measured, an MPP, and an SPP in the embodiment 1.

A method of driving the optical disc device 100 according to the present embodiment will be described, with reference to FIGS. 6 and 8. FIG. 6 is a flowchart illustrating an example operation of the optical disc device according to the present embodiment. FIG. 8 is a waveform chart illustrating waveforms of a lens midpoint servo signal, the TE signal measured, MPP, and SPP in the present embodiment. It should be noted that FIG. 8 shows the case where the offset of the center of gravity of the optical disc OD is considerable in a range where servo is allowed.

Figure 7:
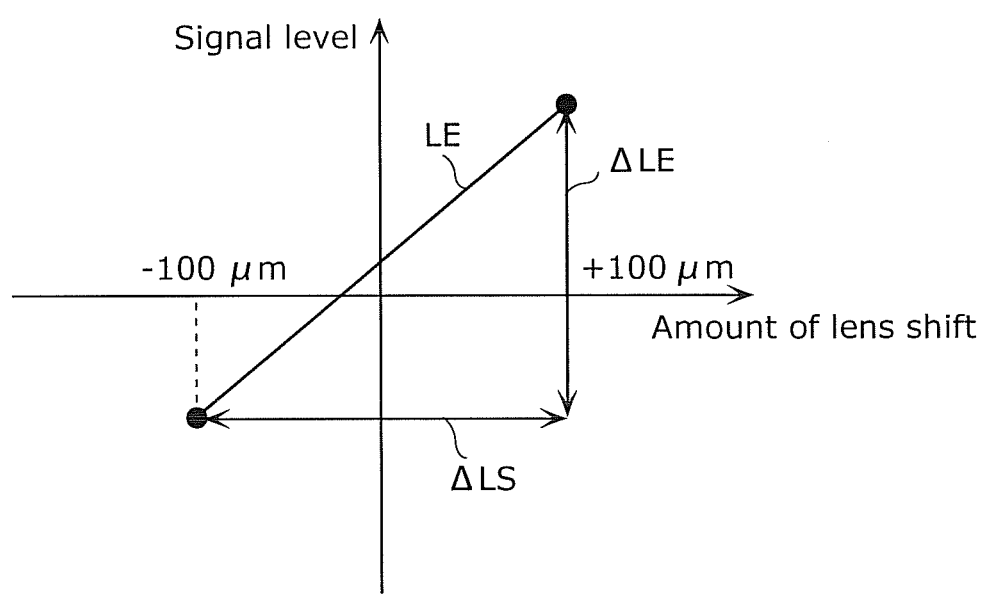
FIG. 7 is a graph illustrating a relationship between a lens midpoint servo signal and an amount of shift of an objective lens.

The control unit 60 of the optical disc device 100 starts a lens midpoint servo process (a midpoint servo process) at a time t0 (S101). Here, the lens midpoint servo process refers to a process of using the LE signal to hold the radial position of the objective lens 24 of the optical pickup 20 shown in FIG. 3 at the midpoint location of the optical pickup 20. FIG. 7 is a graph illustrating a relationship between the lens midpoint servo signal (LE in FIG. 7) and an amount of shift of the objective lens 24. FIG. 7 shows the relationship in a range of ±100 μm. During the adjustment of the value of K, the optical disc OD is rotated twice as fast as usual.

The control unit 60 moves the objective lens 24 multiple times to measure the TE signal. Specifically, the control unit 60 performs a first measurement process (S102) of moving the objective lens 24 toward alignment with the center of the optical disc OD to a predetermined position to measure the TE signal, and a second measurement process (S103) of moving the objective lens 24 away from alignment with the center of the optical disc OD to a predetermined position to measure the TE signal.

In the first measurement process (S102), the LE signal generating unit 32, at a time t1, adds to the LE signal a positive offset value for shifting the objective lens 24 toward alignment with the center of the optical disc OD (S111, an offset process). Specifically, when the time t1 arrives, the control unit 60 writes a digital value corresponding to an amount of lens shift (e.g., 100 μm) to a predetermined register, and the offset adder unit O1 of the LE signal generating unit 32 generates a voltage corresponding to the digital value. The adder ADD7 adds to the LE signal a voltage corresponding to the positive offset value generated by the offset adder unit O1. The optical pickup drive unit 26 moves the objective lens 24 toward alignment with the center of the optical disc OD, in response to the offset value being added to the LE signal.

After adding the positive offset value to the LE signal, the control unit 60 performs a stabilization awaiting process of waiting for a first time (by way of example of a first fixed time), which is set according to the positive offset value, to elapse (S112). The first time is a time unique to the optical disc device 100. Here, in the present embodiment, when the amount of shift of the objective lens 24 from the midpoint location of the optical pickup 20 is 100 μm, the first time is set to 5 msec. The first time may be set to be, for example, in a range from 5 msec to 20 msec when the amount of shift of the objective lens 24 from the midpoint location of the optical pickup 20 is 100 μm. It should be noted that if the amount of shift of the objective lens 24 is other than 100 μm, the first time is properly set in response to the amount of shift of the objective lens 24.

After the first time has elapsed (a time t2), the control unit 60 measures the TE signal (S113, a measurement process). The control unit 60 obtains the TE signal from the TE signal generating unit 31 of the signal processing unit 30.

In the second measurement process (S103), the LE signal generating unit 32, at a time t4, adds to the LE signal a negative offset value for shifting the objective lens 24 away from alignment with the center of the optical disc OD (S121, an offset process). Specifically, when the time t4 arrives, the control unit 60 writes a digital value corresponding to an amount of lens shift (e.g., 100 μm) to a predetermined register, and the offset adder unit O1 of the LE signal generating unit 32 generates a voltage corresponding to the digital value. The adder ADD7 adds to the LE signal a voltage corresponding to the negative offset value generated by the offset adder unit O1. The optical pickup drive unit 26 moves the objective lens 24 away from alignment with the center of the optical disc OD, in response to the offset value being added to the LE signal.

After adding the negative offset value to the LE signal, the control unit 60 performs a stabilization awaiting process of waiting for a second time (by way of example of a first fixed time), which is set according to the negative offset value, to elapse (S122). The second time is, as with the first time, a time unique to the optical disc device 100. Here, in the present embodiment, the first time and the second time is set to a same value. The amount of shift of the objective lens 24 from the midpoint location of the optical pickup 20 then is set to 100 μm as with the first measurement process. It should be noted that if the amount of shift of the objective lens 24 is other than 100 μm, the second time is properly set in response to the amount of shift of the objective lens 24.

After the second time has elapsed (a time t5), the control unit 60 measures the TE signal (S123, a measurement process). The control unit 60 obtains the TE signal from the TE signal generating unit 31 of the signal processing unit 30.

After the execution of the second measurement process (S103), the control unit 60 causes the offset adder unit O1 to restore the offset value of the LE signal (S104).

The control unit 60 ends the lens midpoint servo process (S105).

The control unit 60 uses the TE signal measured in the first measurement process (S102) and the TE signal measured in the second measurement process (S103) to adjust the value of K (S106, a K value adjusting process).

<1-3. Effects>

The optical disc device 100 according to the present embodiment measures the TE signal in adjusting the value of K after the lens oscillation has reduced to some extent, thereby allowing reduction in variation of the adjusted value of K. For example, as can be seen from FIG. 8, the amplitude of the measured signal increases after the objective lens 24 is shifted (after the lens midpoint servo signal is displaced), and gradually reduces. Thus, the TE signal is measured after the amplitude of the measured signal has reduced to some extent, thereby allowing reduction in variation of the adjusted value of K.

Hereinafter, a difference of the optical disc device 100 according to the present embodiment from a conventional optical disc device will be described, with reference to FIGS. 9 and 10.

Figure 9:
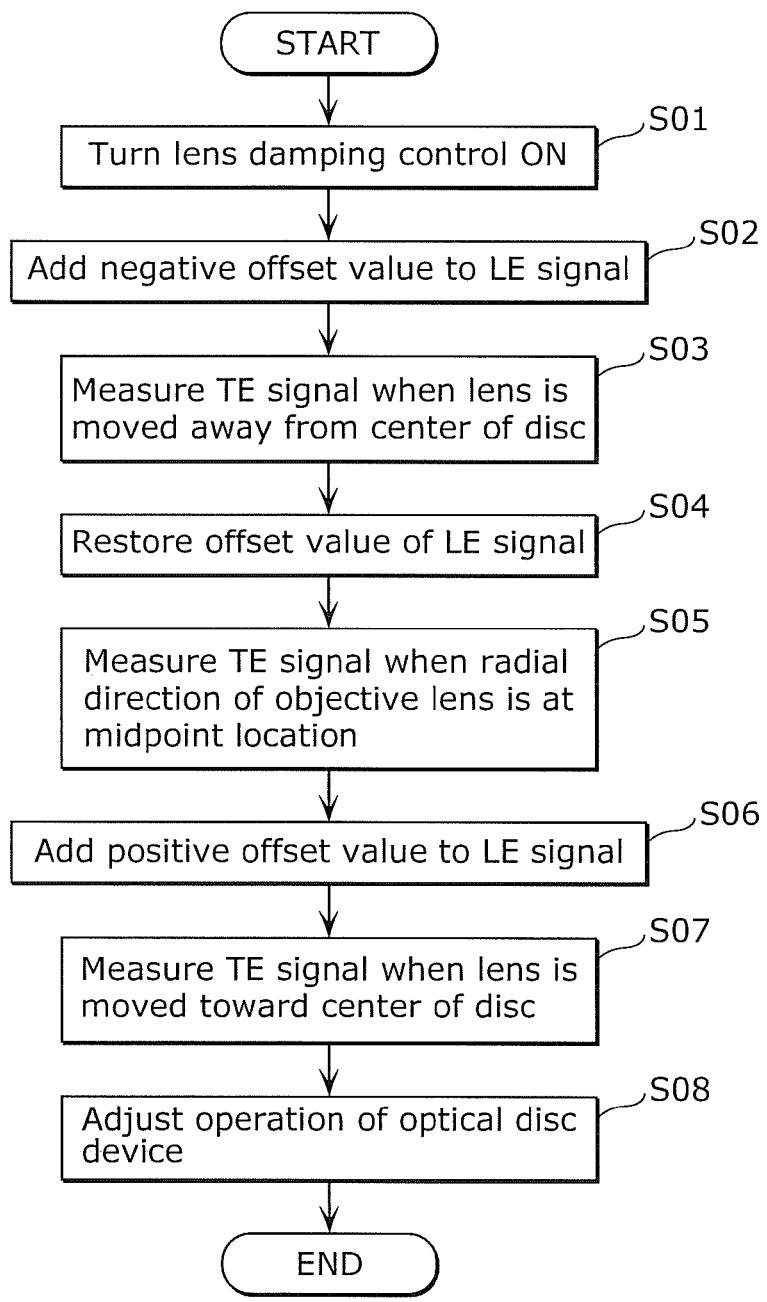
FIG. 9 is a flowchart illustrating an example operation of a conventional optical disc device.

FIG. 9 is a flowchart illustrating an example operation of a conventional optical disc device. FIG. 10 is a diagram illustrating respective waveforms in the flowchart illustrated in FIG. 9.

As shown in FIG. 9, the conventional optical disc device, first, starts lens damping control for restricting an objective lens from moving in the optical axis direction (S01).

The conventional optical disc device adds a negative offset value to the LE signal (S02), and immediately thereafter measures the TE signal (S03).

Subsequently the conventional optical disc device restores the offset value of the LE signal to place the objective lens at the midpoint location of the optical pickup 20 (S04), and measures the TE signal, while having the objective lens at the midpoint location in the radial direction of the objective lens (S05). The conventional optical disc device adds a positive offset value to the LE signal (S06), and immediately thereafter measures the TE signal (S07).

The conventional optical disc device uses the TE signals obtained in steps S03, S05, S07 to adjust the value of K (S08).

Figure 10:
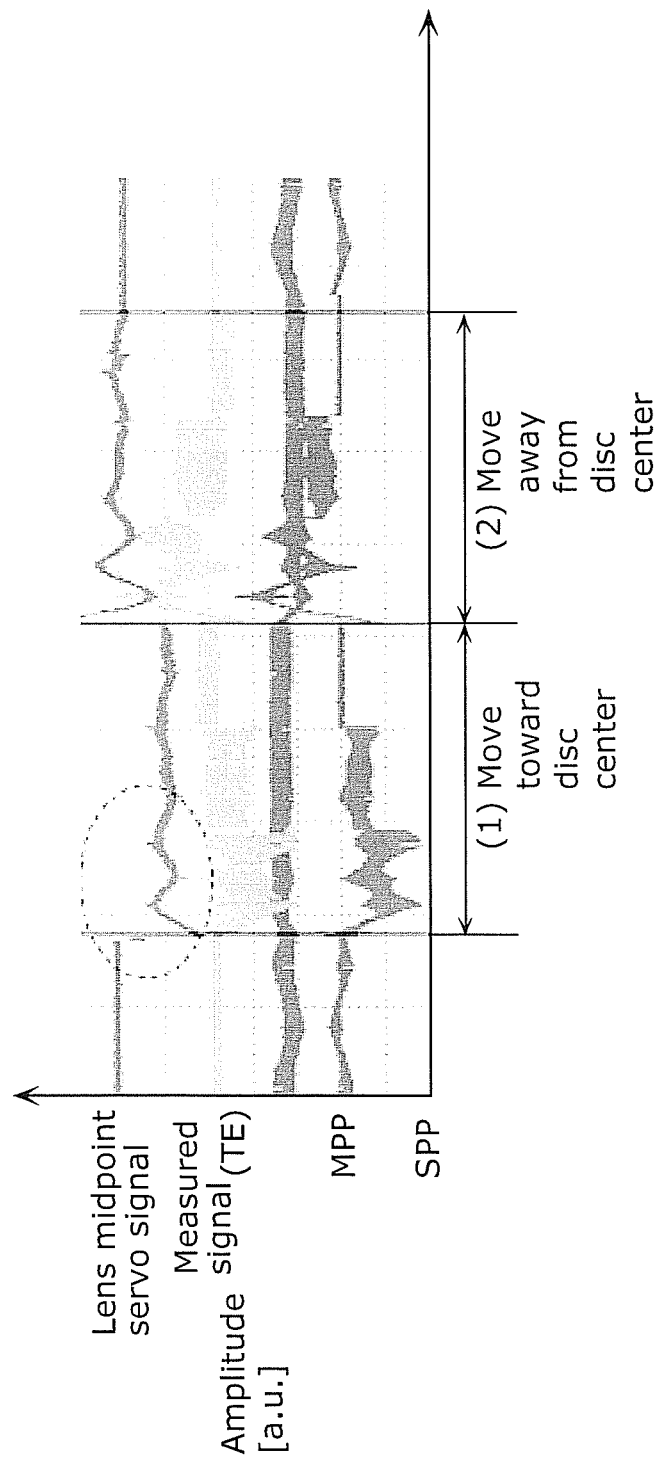
FIG. 10 is a diagram illustrating the respective waveforms in the flowchart illustrated in FIG. 9.

According to the method of adjusting the value of K in the conventional optical disc device, as indicated by the dotted line in FIG. 10, the TE signal is measured while the amplitude of the LE signal (the lens midpoint servo signal) is large. Due to this, the adjusted value of K is subject to variation.

In contrast, the optical disc device 100 according to the present embodiment measures the TE signal after the amplitude of the LE signal (the lens midpoint servo signal) has reduced to some extent, as can be seen from FIG. 8. Thus, the variation of the adjusted value of K can be reduced.

Embodiment 2

Figure 11:
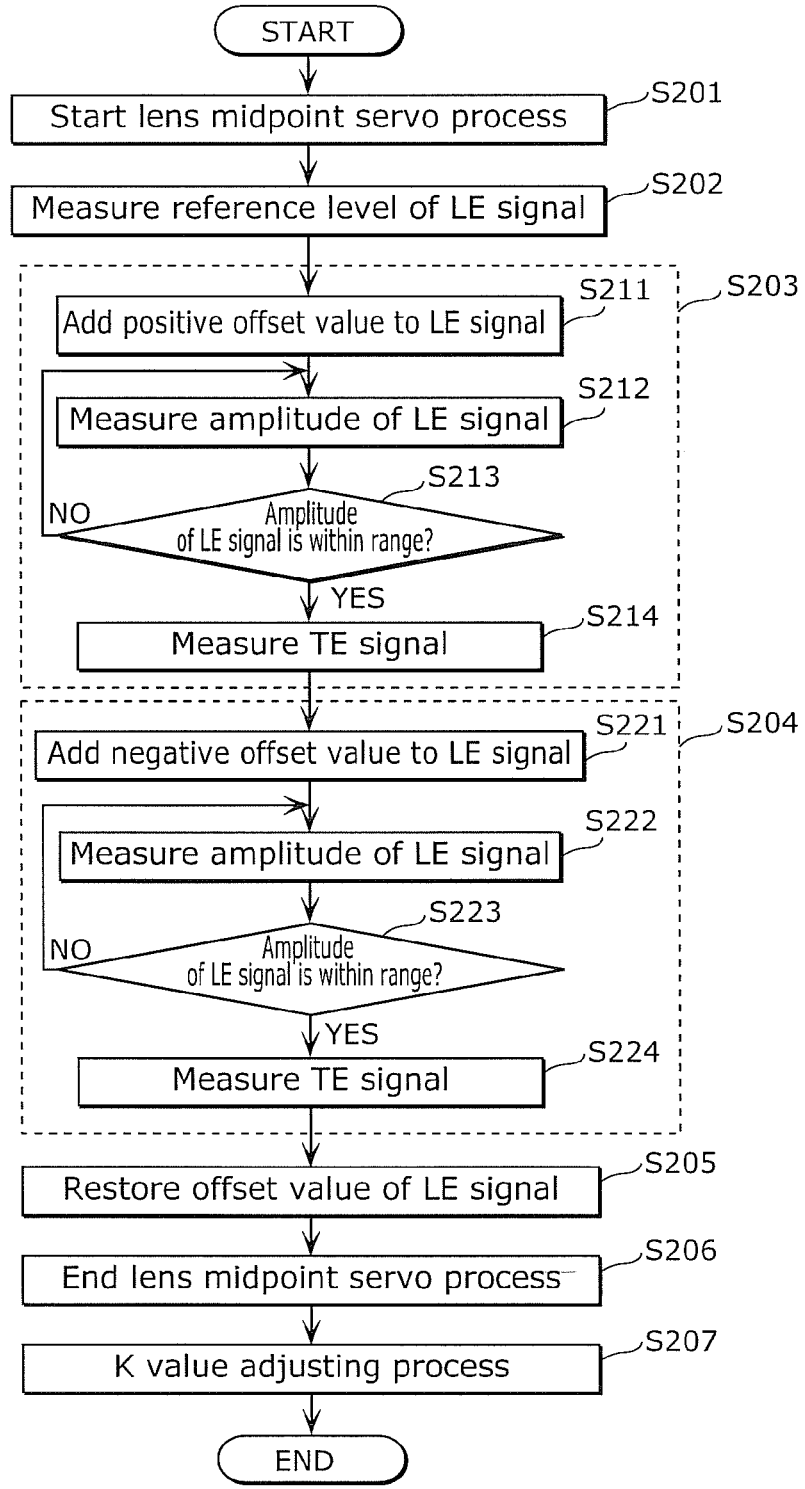
FIG. 11 is a flowchart illustrating an example operation of an optical disc device according to an embodiment 2.
Figure 12:
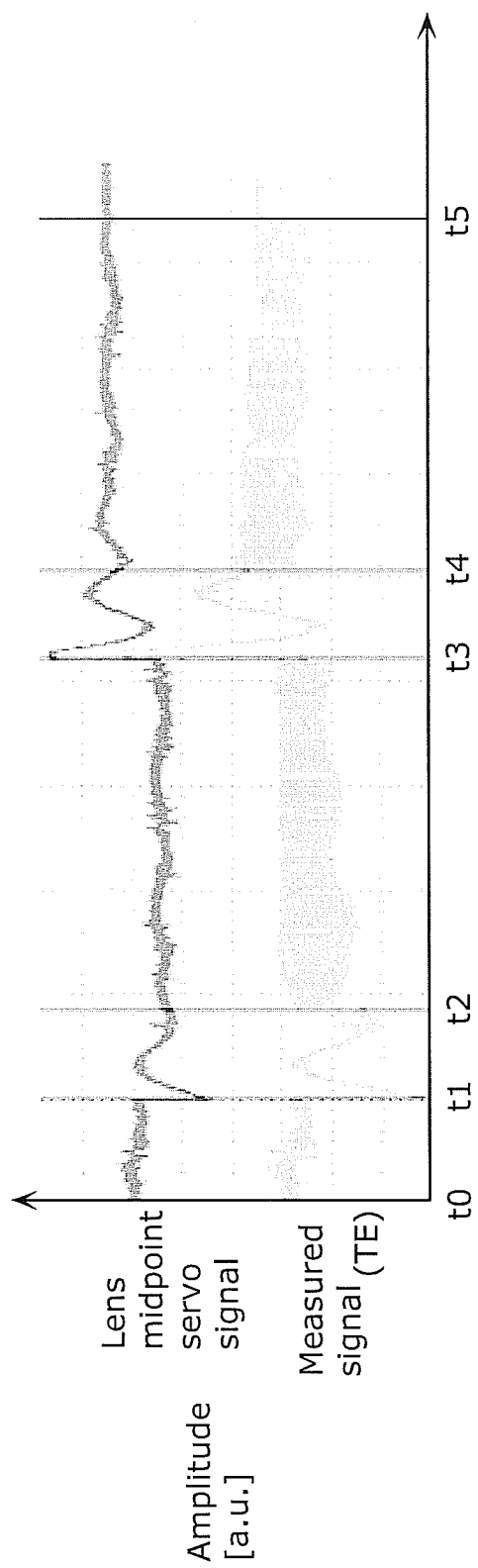
FIG. 12 is a waveform chart illustrating waveforms of a lens midpoint servo signal and a TE signal measured in the embodiment 2.

An optical disc device and a method for driving the same according to and embodiment 2 will be described, with reference to FIGS. 11 to 13.

In the embodiment 1, the TE signal is measured after the first fixed time has passed. However, in the present embodiment, the amplitude of an LE signal is measured to determine a timing of measurement of a TE signal.

It should be noted that the optical disc device according to the present embodiment has the same configuration as the optical disc device 100 shown in FIG. 3.

<2-1. Method of Driving Optical Disc Device>

A method of driving an optical disc device 100 according to the present embodiment will be described with reference to FIGS. 11 and 12. FIG. 11 is a flowchart illustrating an example operation of an optical disc device according to the present embodiment. FIG. 12 is a waveform chart illustrating waveforms of a lens midpoint servo signal and a TE signal measured in the present embodiment. It should be noted that FIG. 12 shows the case where the offset of the center of gravity is considerable in a range where servo is allowed.

A control unit 60 of the optical disc device 100, first, starts a lens midpoint servo process (S201). As described in the embodiment 1, the optical disc OD is rotated twice as fast as usual during the adjustment of the value of K.

The control unit 60, next, measures a reference level of an LE signal in the present embodiment (S202). Furthermore, the control unit 60 sets, from the reference level, a reference range for determining whether the lens oscillation has reduced (a reference range setting process).

Here, the reference level is measured after a second fixed time has elapsed, for example, 10 msec since the start of the lens midpoint servo process. This is because the lens oscillation has desirably reduced to some extent by the time of measurement of the reference level, due to a fact that the above-mentioned reference range for determining whether the lens oscillation has reduced is set from the reference level. The reference range can be set, taking into account, for example, at least either the length of the second fixed time or a range where the variation in adjusted value of K can be reduced. The reference range is less than or equal to the reference level in the present embodiment.

After measuring the reference level of the LE signal, the control unit 60 moves an objective lens 24 multiple times to measure the TE signal. Specifically, the control unit 60 performs a first measurement process (S203) of moving the objective lens 24 toward alignment with the center of an optical disc OD to a predetermined position to measure the TE signal, and a second measurement process (S204) of moving the objective lens 24 away from alignment with the center of the optical disc OD to a predetermined position to measure the TE signal.

In the first measurement process (S203), an LE signal generating unit 32, at a time t1, adds to the LE signal a positive offset value for shifting the objective lens 24 toward alignment with the center of the optical disc OD (S211, an offset process). Specifically, when a time t1 arrives, the control unit 60 writes a digital value corresponding to an amount of lens shift (e.g., 100 µm) to a predetermined register, and an offset adder unit O1 of the LE signal generating unit 32 generates a voltage corresponding to the digital value. An adder ADD7 adds to the LE signal a voltage corresponding to the positive offset value generated by the offset adder unit O1. An optical pickup drive unit 26 moves the objective lens 24 toward alignment with the center of the optical disc OD in response to the offset value being added to the LE signal.

The control unit 60 measures the amplitude of the LE signal (S212), and determines whether the amplitude of the LE signal is within the reference range (S213, a stabilization awaiting process). If the amplitude of the LE signal is outside the reference range ("NO" in S213), the control unit 60 proceeds to step S212.

If the amplitude of the LE signal is within the reference range ("YES" in S213), the control unit 60 measures the TE signal (S214, a measurement process). The control unit 60 obtains the TE signal from a TE signal generating unit 31 of a signal processing unit 30.

In the second measurement process (S204), the LE signal generating unit 32, at a time t3, adds to the LE signal a negative offset value for shifting the objective lens 24 away from alignment with the center of the optical disc OD (S221, an offset process). Specifically, when the time t3 arrives, the control unit 60 writes a digital value corresponding to an amount of lens shift (e.g., 100 µm) to a predetermined register, and the offset adder unit O1 of the LE signal generating unit 32 generates a voltage corresponding to the digital value. The adder ADD7 adds to the LE signal a voltage corresponding to the negative offset value generated by the offset adder unit O1. The optical pickup drive unit 26 moves the objective lens 24 away from alignment with the center of the optical disc OD, in response to the offset value being added to the LE signal.

The control unit 60 measures the amplitude of the LE signal (S222), and determines whether the amplitude of the LE signal is within the reference range (S223, a stabilization awaiting process). If the amplitude of the LE signal is outside the reference range ("NO" in S223), the control unit 60 proceeds to step S222.

If the amplitude of the LE signal is within the reference range ("YES" in S223), the control unit 60 measures the TE signal (S224, a measurement process). The control unit 60 obtains the TE signal from a TE signal generating unit 31 of a signal processing unit 30.

After the execution of the second measurement process (S204), the control unit 60 causes the offset adder unit O1 to restore the offset value of the LE signal (S205).

The control unit 60 ends the lens midpoint servo process (S206).

The control unit 60 uses the TE signal measured in the first measurement process (S203) and the TE signal measured in the second measurement process (S204) to adjust the value of K (S207, a K value adjusting process).

In the above-described method of adjusting the value of K as illustrated in steps S213 and S223, the control unit 60 waits for the measurement of the TE signal until the amplitude of the LE signal falls within the reference range. However, given the responsiveness of the optical disc device 100 or the like, the control unit 60 may measure the TE signal (timeout) after a third fixed time (e.g., 30 msec) has elapsed, despite that the amplitude of the LE signal is outside the reference range.

<2-2. Effects>

The optical disc device 100 according to the present embodiment measures the TE signal in adjusting the value of K after the amplitude of the LE signal falls within the reference range, namely, after the lens oscillation has reduced to within a certain range, thereby reliably reducing the variation in adjusted value of K. Moreover, the optical disc device 100 according to the present embodiment determines a timing of the measurement of the TE signal by actually measuring the LE signal. Thus, there is no need for prior knowledge of characteristics of an optical disc device.

Figure 13:
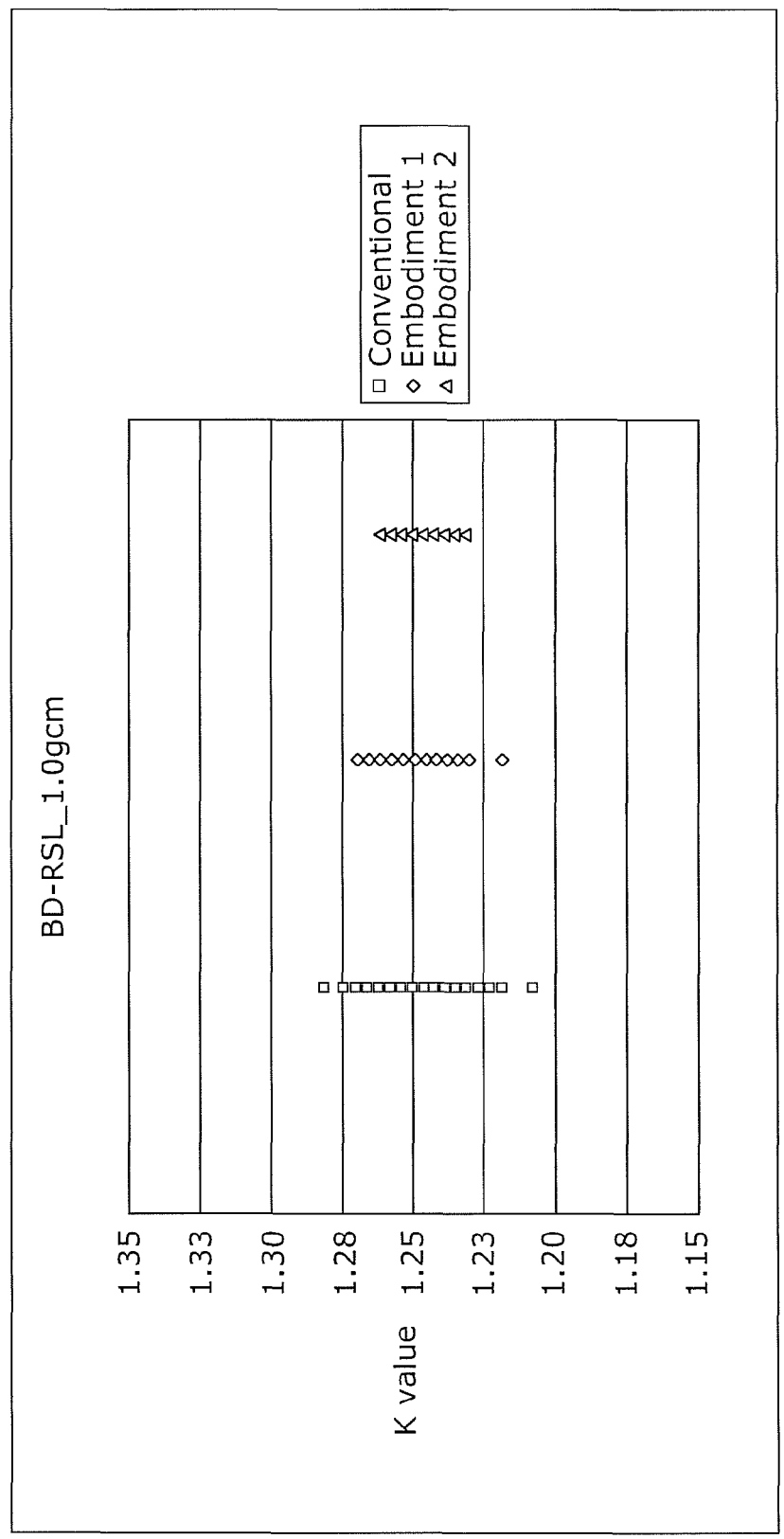
FIG. 13 is a graph illustrating an example of variation in adjusted value of K in the conventional optical disc device and the optical disc devices according to the embodiments 1 and 2.

FIG. 13 is a graph illustrating an example of variation in adjusted value of K in a conventional optical disc device, and the optical disc devices 100 according to the embodiment 1 and the present embodiment (the embodiment 2). The squares in FIG. 13 each indicate the value of K in the conventional optical disc device. The rhomboids each indicate the value of K in the optical disc device 100 according to the embodiment 1. The triangles each indicate the value of K in the optical disc device 100 according to the present embodiment.

As can be seen from FIG. 13, the embodiments 1 and 2 both exhibit reduced variation in value of K, as compared with the conventional optical disc device.

Embodiment 3

An optical disc device and a method for driving the same according to an embodiment 3 will be described.

In the embodiment 2, a timing of the measurement of the TE signal is determined according to whether the amplitude of the LE signal is within the reference range. However, an optical disc device 100 according to the present embodiment sets a reference range depending on adjustment precision.

It should be noted that the optical disc device according to the present embodiment has the same configuration as the optical disc device 100 shown in FIG. 3.

<3-1. Method of Driving Optical Disc Device>

A method for driving the optical disc device 100 according to the present embodiment will be described, with reference to FIG. 11.

A control unit 60 of the optical disc device 100 starts a lens midpoint servo process (S201), and, after a period of time thereafter, measures a reference level of an LE signal and sets a reference range (S202).

Here, in the present embodiment, the control unit 60 sets the reference range accordingly, depending on desired precision from the optical disc device 100 in playback and recording of an optical disc OD.

Specifically, for example, the reference range is less than or equal to the reference level or a range of plus or minus 10% from the reference level, if high precision is required (high precision). For example, the reference range is of plus or minus 20% from the reference level, if common precision is required (less precision). Furthermore, for example, the reference range is of plus or minus 30% from the reference level, if less precision is required (low precision).

After measuring the reference level of the LE signal, the control unit 60 moves an objective lens 24 multiple times to measure the TE signal. Specifically, the control unit 60 performs a first measurement process (S203) of moving the objective lens 24 toward alignment with the center of an optical disc OD to a predetermined position to measure the TE signal, and a second measurement process (S204) of moving the objective lens 24 away from alignment with the center of the optical disc OD to a predetermined position to measure the TE signal.

The procedures of the first measurement process (S203) and the second measurement process (S204) are the same as in the embodiment 2.

After the execution of the second measurement process (S204), the control unit 60 causes the offset adder unit O1 to restore the offset value of the LE signal (S205).

The control unit 60 ends the lens midpoint servo process (S206).

The control unit 60 uses the TE signal measured in the first measurement process (S203) and the TE signal measured in the second measurement process (S204) to adjust the value of K (S207, a K value adjusting process).

It should be noted that timeout may be provided in steps S213 and S223 in the present embodiment as well.

<3-2. Effects>

The optical disc device 100 according to the present embodiment sets the reference range depending on precision in playback and recording of an optical disc OD, thereby allowing setting depending on application of the optical disc device. It should be noted that different reference ranges may be set for different optical disc devices, or, if one optical disc device can play a plurality of types of media, different reference ranges may be set for different media, for example.

Moreover, the optical disc device 100 according to the present embodiment measures the TE signal in adjusting the value of K after the amplitude of the LE signal falls within the reference range, namely, after the lens oscillation has reduced to within a certain range, thereby reliably reducing the variation in adjusted value of K. Moreover, the optical disc device 100 according to the present embodiment, similarly to the embodiment 2, determines a timing of the measurement of the TE signal by actually measuring the LE signal. Thus, there is no need for prior knowledge of characteristics of an optical disc device.

Other Embodiment

The optical disc devices according to the embodiments of the present invention have been described above. However, the present invention is not limited to the embodiments.

It should be noted that each of the devices (e.g., the control unit 60) described above may be configured in, specifically, a computer system which includes a microprocessor, a read only memory (ROM), a random access memory (RAM), a hard disk drive, a display unit, a keyboard, a mouse, and so on. A computer program is stored in the RAM or the hard disk drive. The function of each device is performed by the microprocessor operating according to the computer program. Here, the computer program includes a combination of a plurality of instruction codes for giving instructions to the computer to perform predetermined functions.

Furthermore, some (e.g., some or the whole of the control unit 60) of the components included in each of the devices described above may be configured with one system LSI (Large Scale Integration). The system LSI is a super multi-function LSI fabricated by integrating a plurality of components on one chip, and is, specifically, a computer system which includes a microprocessor, a ROM, a RAM, and so on. The RAM stores the computer program. The system LSI performs its functionality by the microprocessor operating according to the computer program.

Furthermore, some (e.g., some or the whole of the control unit 60) of the components included in each of the devices described above may be configured with an IC card or a single module detachable to the device. The IC card or the module is a computer system which includes a microprocessor, a ROM, a RAM, and so on. The IC card or the module may include the super multi-function LSI described above. The IC card or the module performs its functionality by the microprocessor operating according to the computer program. The IC card or the module may be of tamper-resistant.

Moreover, the present invention may be implemented in the methods described above. Moreover, the present invention may be achieved in a computer program implementing such methods via a computer, or may be implemented in digital signals including the computer program.

Furthermore, the present invention may be achieved in a non-transitory computer-readable recording medium having stored therein the computer program or the digital signals, such as a flexible disk, a hard disk, CD-ROM, MO, DVD, DVD-ROM, DVD-RAM, BD (Blu-ray (registered trademark) Disc), and a semiconductor memory. Moreover, the present invention may be implemented in the digital signals stored in such the non-transitory recording medium.

Moreover, the present invention may be achieved in transmitting the computer program or the digital signals via an electric communication line, a wireless or wired communication line, a network represented by the Internet, data broadcast, or the like.

Moreover, the present invention may be achieved in a computer system which includes a microprocessor and a memory. The memory may store the computer program and the microprocessor may operate according to the computer program.

Moreover, by transferring the program or the digital signals in the non-transitory recording medium or transferring the program or the digital signals via the network or the like, the program or the digital signals may be executed in other independent computer system.

Furthermore, the above-described embodiments may be combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is useful in optical discs device such as DVD and BD.

The invention claimed is:

1. An optical disc device comprising:
an optical pickup including an objective lens which focuses a laser light from a predetermined light source on any position on an optical disc, and a receiver unit configured to receive light reflected off the optical disc;
a signal processing unit configured to generate a main push-pull signal and a sub push-pull signal from signals from the receiver unit, and subtract, from the main push-pull signal, a signal obtained by multiplying the sub push-pull signal K times, to generate a tracking-error signal; and
a control unit configured to perform tracking control in response to the tracking-error signal and a lens-error signal which indicates displacement of the objective lens,
wherein the control unit is configured to perform:
a midpoint servo process of aligning a radial position of the objective lens with a midpoint location;
an offset process of adding an offset value to the lens-error signal after a start of the midpoint servo process;
a stabilization awaiting process of waiting for oscillation of the optical disc to stabilize, after performing the offset process;
a measurement process of measuring the tracking-error signal using the signal processing unit, after performing the stabilization awaiting process; and
a K value adjusting process of adjusting a value of the K, in response to a result of the measurement process.

2. The optical disc device according to claim 1, wherein the control unit is configured to wait for a first fixed time, which is set previously, to elapse in the stabilization awaiting process to wait for the oscillation of the optical disc to stabilize.

3. The optical disc device according to claim 2, wherein the first fixed time is set in response to the offset value.

4. The optical disc device according to claim 2, wherein the first fixed time is set to 5 msec or greater and 20 msec or less when an amount of shift of the objective lens which is determined in response to the offset value is 100 μm.

5. The optical disc device according to claim 1, wherein in the stabilization awaiting process, the control unit is configured to wait for a current amplitude of the lens-error signal to fall, within a reference range to wait for the oscillation of the optical disc to stabilize, the reference range being predetermined.

6. The optical disc device according to claim 5, wherein the control unit is further configured to perform, after a start of the midpoint servo process and before performing the offset process, a reference range setting process of measuring an amplitude of the lens-error signal using the signal processing unit and setting the reference range in response to the measured amplitude.

7. The optical disc device according to claim 6, wherein after a second fixed time has elapsed since the start of the midpoint servo process, the control unit is configured to perform the reference range setting process.

8. The optical disc device according to claim 5, wherein the reference range is set in response to desired precision from the optical disc device, in addition to an amplitude of the lens-error signal measured.

9. The optical disc device according to claim 1, wherein the control unit is configured to perform the offset process, the stabilization awaiting process, and the measurement process multiple times, changing the offset value in the offset process.

10. A method for driving an optical disc device including:
an optical pickup including an objective lens which focuses a laser light from a predetermined light source on any position on an optical disc, and a receiver unit configured to receive light reflected off the optical disc;
a signal processing unit configured to generate a main push-pull signal and a sub push-pull signal from signals from the receiver unit, and subtract, from the main push-pull signal, a signal obtained by multiplying the sub push-pull signal K times, to generate a tracking-error signal; and
a control unit configured to perform tracking control in response to the tracking-error signal and a lens-error signal which indicates displacement of the objective lens,
the method comprising:
aligning, by the control unit, a radial position of the objective lens with a midpoint location;
adding, by the control unit, an offset value to the lens-error signal after the radial position of the objective lens is aligned with the midpoint location,
waiting, by the control unit, for oscillation of the optical disc to stabilize after the offset value is added;
measuring, by the control unit, the tracking-error signal using the signal processing unit after the oscillation of the optical disc is stabilized; and
adjusting a value of the K in response to a result of measuring the tracking-error signal.

* * * * *